May 25, 1937.  J. G. TOMPKINS  2,081,467
HOSE SUPPORTER
Filed Oct. 26, 1934
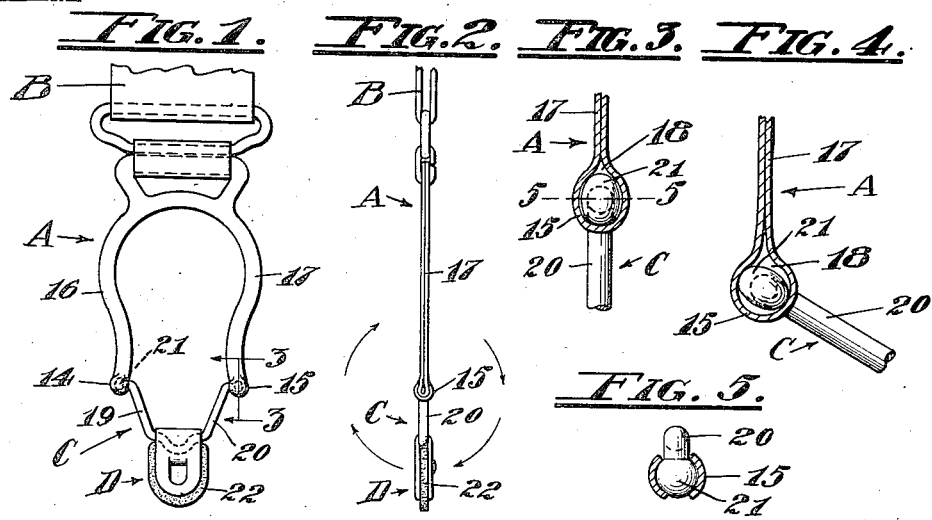
Inventor.
James G. Tompkins.
By R. S. Berry
Att'y.

Patented May 25, 1937

2,081,467

UNITED STATES PATENT OFFICE 2,081,467

HOSE SUPPORTER

James G. Tompkins, Los Angeles, Calif.

Application October 26, 1934, Serial No. 750,157

3 Claims. (Cl. 24—243)

This invention relates to a hose supporter and particularly pertains to the type of hose supporter embodying a pair of pivotally connected supporting and fastening yokes, arranged with the fastening yoke depending from the other, and with the open ends of the yokes presented toward each other, and in which the dependent fastening yoke is adapted to be swung through the supporting yoke and turned a complete or a partial revolution around its axis in such manner as to effect wrapping of a portion of a piece of fabric of a hose around the connected end portion of the fastening yoke; the invention more especially pertaining to improvements in the construction of hose supporters of the character set forth in my co-pending applications for United States Letters Patent Serial Numbers 693,603; 693,605; 750,158, and 750,159, and also set forth in Reissued Patent Number 19,930 of April 14, 1936.

An object of the invention is to provide a construction whereby the dependent fastening yoke will have a tendency to extend in longitudinal alignment with the supporting yoke, and whereby swinging of the fastening yoke on its axis in either direction from its dependent position will be yieldably resisted so as to minimize possibility of the fastening yoke being accidentally swung through the supporting yoke and thereby causing unwanted disengagement of the hose therefrom.

Another object is to provide a resistance to swinging of the fastening yoke out of its depending position so as to facilitate disposing of the fastening yoke while in a dependent position against the portion of the fabric of the hose to be wrapped thereon, thereby minimizing fumbling of the supporter in effecting connection of the hose therewith as is liable to occur where the swinging of the fastening yoke out of its aligned position with the supporting yoke is free and unrestrained.

Another object is to provide a yieldable resistance to swinging of the fastening yoke out of its depending position which is embodied in the pivotal connection between the yokes in a manner which will obviate the use of supplemental pieces or parts in affording such resistance.

With the foregoing objects in view, together with such other objects and advantages as may subsequently appear, the invention resides in the parts and in the combination, construction and arrangement of parts hereinafter described and claimed and illustrated by way of example in the accompanying drawing in which:

Fig. 1 is a view of the hose supporter as seen in front elevation with the fastening yoke as disposed in its depending position, showing a preferred embodiment of the invention;

Fig. 2 is a view of the hose supporter shown in Fig. 1 as seen in side elevation;

Fig. 3 is a view in vertical section partly in elevation as seen on the line 3—3 of Fig. 1 in the direction indicated by the arrows;

Fig. 4 is a view similar to Fig. 3 showing the fastening yoke as disposed to one side of its dependent position;

Fig. 5 is a view in horizontal section taken on the line 5—5 of Fig. 3.

Referring to the drawing more specifically A indicates generally a supporting yoke the closed end of which is attached to an elastic strip B or other suitable member of a garter, belt, girdle corset, or the like, and C designates generally a fastening yoke which has its open end pivotally connected to the open end of the yoke A, which fastening yoke is mounted and arranged so that it may be swung completely around its axis and passed through the yoke A. The fastening yoke C is designed to be normally disposed in a dependent position relative to the yoke A with its side members in alignment with the side members of the latter as particularly shown in Figs. 1, 2, and 3.

The supporting yoke A is formed of sheet metal, being composed of a stamped metal strip or sheet bent upon itself with the bend intermediate its ends forming the end portions 14 and 15 of the side members 16 and 17 of the yoke. The bent end portions 14 and 15 are shaped to provide vertically elongated sockets 18 of general elliptical outline in vertical section with the opposed vertical side wall portions thereof formed of the overlying portions of the metal strips constituting the side members 16 and 17 of the yoke, and which strips are extended in parallel relation and in contact with each other above the sockets 18. The walls of the sockets 18 are resilient by reason of the inherent resiliency of the metal of which they are formed.

The fastening yoke C, embodies side members 19 and 20 which extend in divergent relation to each other and have their ends bent outwardly and terminating in ovoidal shaped knobs 21 which seat in the sockets 18, as shown in Figs. 3 and 4, and are normally disposed with their longer axes extending in the direction of the lengths of the side members 16 and 17, and which axes extend in the direction of the lengths of the side members of the yoke C. The knobs 21 rotatably fit the sockets 18.

The closed end of the yoke C carries a projection D of suitable construction including a cushion element 22 for affording frictional engagement with fabric wrapped therearound.

In the operation of the invention the fastening yoke C normally depends in alignment with the supporting yoke A by the spring action of the side walls of the socket 18 on the ovoidal knob 21 of the fastening yoke. Manifestly any swinging movement of the yoke C relative to the yoke A will be yieldably opposed since such movement effects turning of the knobs 21 around their horizontal axes causing the elongated end portions of the knobs to bear against the opposed sides of the sockets 18 and expand the latter in opposition to the tension of the metal of which they are formed, which tension yieldably resists turning of the knobs 21 in the sockets 18. The manner of distending the side walls of the sockets 18 in effecting turning of the knobs 21 therein is illustrated in Fig. 4.

From the foregoing it will be seen that the fastening yoke C when disposed in its dependent position in alignment with the supporting yoke A will be held against free swinging movement in either direction, but may be swung under the resistance afforded by the spring action of the side members of the supporting yoke on the end members of the fastening yoke.

In the application and operation of the invention, the hose supporter is disposed with the fastening yoke C depending from the supporting yoke A positioned alongside the portion of the hose or fabric to be engaged thereby, whereupon the fastening yoke C is swung upwardly with a portion of the fabric of the hose astride thereof; the fastening yoke being then advanced through the supporting yoke and brought downwardly to its initial depending position, whereupon a portion of the fabric will be extended through the fastening yoke and on being pulled downwardly, or the supporting yoke being pulled upwardly, the portion of the hose extending alongside the fastening yoke will overlie a portion of the fabric engaged over the end of the fastening yoke thus effecting such engagement with the fabric that any pull on the latter away from the fastening yoke will more tightly effect connection between the fabric and the yoke.

When it is desired to detach the fabric from the fastening yoke the latter is swung upwardly in the direction opposite that initially employed in effecting connection with the fabric, and on the fastening yoke then being swung to the opposite side of the supporting yoke a slight pull on the fabric will effect release thereof.

By reason of the resistance to turning of the fastening yoke from its dependent position its initial positioning alongside the hose is greatly facilitated since it tends to normally extend in alignment or near alignment with the supporting yoke, and after engagement of the hose therewith such resistance to movement of the fastening yoke serves to impede retrograde movement of the fastening yoke and accordingly minimizes possibility of accidental disengagement of the hose from the fastening yoke.

While I have described the invention as applied to the supporting of hose it will be understood that it may be used to support other garments.

I claim:

1. In a hose supporter, a supporting yoke having its side members formed of overlapped strips of metal formed to provide elongated sockets at the ends of said yoke, a fastening yoke, and ovoidal knobs at the ends of said fastening yoke pivotally seated in said sockets.

2. In a hose supporter, a supporting yoke having elongated sockets in its side members formed with resilient walls, a fastening yoke, and ovoidal knobs on the side members of said fastening yoke pivotally seated in said sockets; the walls of said sockets being arranged to yieldably oppose swinging of said fastening yoke from its normal position.

3. In a hose supporter, a fastening yoke having spaced side members formed with out turned end portions, ovoidal knobs on the terminals of said end portions, and supporting members having elongated sockets formed with resilient walls in which sockets said knobs are carried; the walls of said sockets being arranged to yieldably oppose swinging of said fastening yoke from a normal position.

JAMES G. TOMPKINS.